United States Patent [19]

Kidd et al.

[11] 4,357,126

[45] Nov. 2, 1982

[54] INFEED COUNTING CONVEYOR

[75] Inventors: Arthur H. Kidd, Menomonee Falls; Burdette A. Petersen, Plymouth, both of Wis.

[73] Assignee: H. G. Weber & Co., Inc., Kiel, Wis.

[21] Appl. No.: 167,245

[22] Filed: Jul. 10, 1980

[51] Int. Cl.[3] .................... B65G 57/08; B65H 29/40; B65H 31/30; B65H 33/16

[52] U.S. Cl. .................................... 414/46; 271/187; 271/218; 271/315; 414/50; 414/81

[58] Field of Search ............... 271/315, 187, 213, 218, 271/217, 219; 414/46, 50, 81; 198/732

[56] References Cited

U.S. PATENT DOCUMENTS

| | | | |
|---|---|---|---|
| 408,391 | 8/1889 | Tucker | 271/187 |
| 1,266,737 | 5/1918 | Wood et al. | 414/46 |
| 2,109,050 | 2/1938 | Quick et al. | 271/315 X |
| 3,279,792 | 10/1966 | Kostal et al. | 271/218 |
| 3,390,508 | 7/1968 | Heimlicher | 53/124 |
| 3,404,609 | 10/1969 | Hartbauer | 93/93 |
| 3,596,779 | 8/1971 | Osteen | 214/6.5 |
| 3,624,723 | 11/1971 | Cannon | 93/93 DP |

FOREIGN PATENT DOCUMENTS

| | | | |
|---|---|---|---|
| 355162 | 8/1961 | Switzerland | 271/187 |

*Primary Examiner*—Bruce H. Stoner, Jr.
*Attorney, Agent, or Firm*—Hill, Van Santen, Steadman, Chiara & Simpson

[57] ABSTRACT

Apparatus for automatically forming hands or stacks of generally flat material such as bags or sacks of a desired count in synchronization with a high production bag manufacturing machine. The apparatus comprises an infeed counting conveyor which automatically accepts the continuous output of the bag machine and collects the bags in discrete stacks of a given quantity which are arranged for assembly into bundles of a uniform thickness to accommodate wrapping or banding.

5 Claims, 7 Drawing Figures

INFEED COUNTING CONVEYOR

BACKGROUND OF THE INVENTION

When assembling bags of the type with closed bottom ends that are flattened and folded back over open ended body portions into bundles for wrapping, the multi-layered bottom ends of a collated stack will build up quicker than the opposite open end portion of the bags. After only a relatively few bags have been collected in a stack, a slope develops which considerably limits the height to which a stable bundle can be formed. Accordingly, bundles are formed of a series of limited quantity stacks assembled for wrapping with the bottom and top ends thereof at alternate sides to achieve a desired bundle quantity with substantially uniform thickness. Originally bundles were hand assembled in this method but with the advent of high production bag manufacturing machines (800 to 1,000 bags formed per minute) hand operations can no longer keep up with these production rates. Later developed pneumatic collating and stacking machines can handle up to approximately 650 bags per minute, but still cannot keep pace with the modern bag machines and are frequently down for servicing. Further, these pneumatic machines required large volumes of compressed air for operation.

More recently, a high production collating and stacking machine was developed which can accommodate these high performance bag manufacturing machines which is the subject of commonly assigned U.S. Ser. No. 053,027 filed June 28, 1979 on behalf of Arthur H. Kidd, now U.S. Pat. No. 4,269,557. The infeed conveying system use in this machine provided a star wheel member to receive individual formed and flattened bags from the high capacity bag machine which in turn deposited the bags in groups on a stop and go traveling collection conveyor. Herein, the bags were supported and guided for travel along the collection conveyor in a somewhat unstable upstanding position; that is, with their open ends extending upward. After a predetermined quantity of bags are collected, an intermittently driven conveyor chain advances a collected bag group toward a transfer surface of the collating and stacking machine. Spaced fingers attached to the chain maintain separation between individual counted bag groups and swing the groups through an approximate 90° arc when depositing the bags horizontally on the transfer surface. It was found that with this motion, lofting and undesirable air disturbances were encountered causing occasional mispositioning of bags which results in poorly formed stacks. Further, the fingers did not afford a positive and reliable means of separating the bags into groups of a uniform quantity. The present invention overcomes the aforementioned problems resulting in a more reliable infeed of counted bags onto the transfer surface of the collating and stacking machine.

SUMMARY OF THE INVENTION

The present invention concerns improvements to a conveyor unit of a bag collating and stacking apparatus which collects formed and flattened bags from the bag machine star wheel and arranges the bags into flat vertically aligned hands or stacks. Further, the unit counts the bags collected in each stack and moves a formed stack onto the transfer surface while maintaining stack integrity.

The star wheel feeds completed bags into the infeed counting conveyor of the bag collating and stacking apparatus wherein the bags are intercepted, decelerated and stripped from the star wheel by a curved stop plate which accommodates forming the bags into flat horizontal stacks at a collecting area of the conveyor. A pair of orbitally driven roller chains are synchronized with the rotation of the star wheel whereby counting conveyor flights, which are drivably connected to the roller chains move a stack of bags out of the collecting area and onto the transfer surface after a predetermined quantity of bags are collected to form a stack of a desired quantity. The conveying flights are each pivotally coupled at forward ends thereof to a different one of the roller chains for side-by-side travel along the conveyor with a top portion of the flights maintained in an upward extending conveying position by means of a rail and slide block arrangement. The rails terminate at a discharge area of the conveyor whereby the flights fall backward away from the stack after the stack is conveyed onto the transfer surface. A paddle separator is provided which cooperates with the counter conveying flights for positively separating the bags into stacks of uniform quantities.

It is therefore an object of this invention to provide an infeed counting conveyor for use in an automatic collating and stacking apparatus which collects bags into precounted "hands" which are consistently well formed in vertically aligned stacks.

It is another object of this invention to provide an improved apparatus for collecting, counting, stacking and conveying bags produced in a high production bag manufacturing machine for subsequent wrapping in bundles of uniform dimensions.

Other objects, features and advantages of our invention will be readily apparent from the following description of a preferred embodiment thereof, taken in conjunction with the accompanying drawings, although variations and modifications may be effected without departing from the spirit and scope of the novel concepts of the disclosure.

DESCRIPTION OF THE PREFERRED EMBODIMENT

Figure 1:
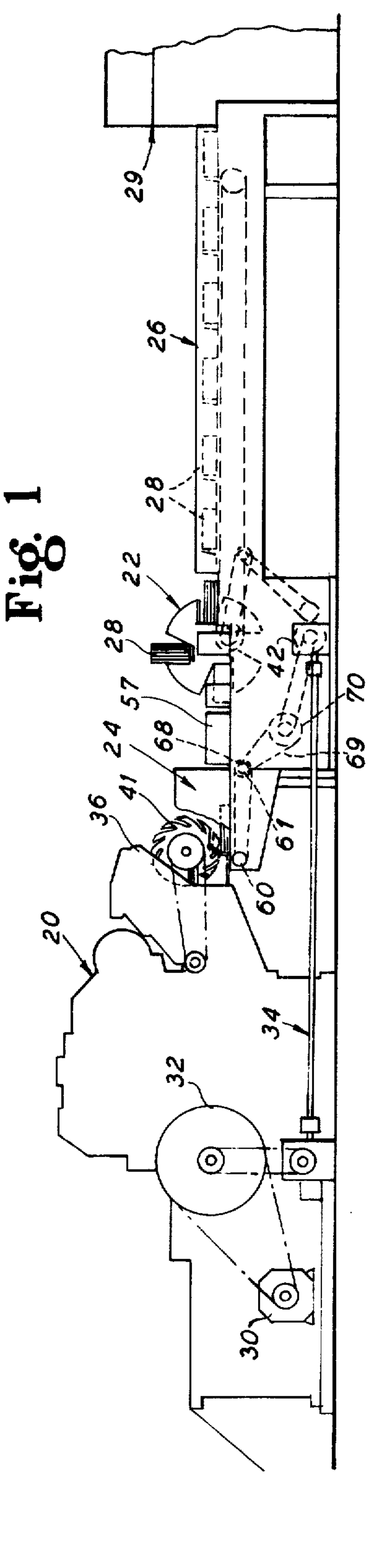
FIG. 1 is a diagrammatic side elevational view of an automatic bag collating and stacking apparatus in which the infeed counting conveyor apparatus of the present invention has been incorporated.

FIG. 1 illustrates an in-line, continuous bag manufacturing operation including a high speed bag producing machine 20 and a collating and stacking apparatus 22 having an infeed counting conveyor 24 and a discharge conveyor 26 for delivering formed stacks of bags 28 to a bundle forming and wrapping apparatus 29. This bag manufacturing operation produces a bale or bundle of vertically aligned, flattened bags with a uniform dimension and stable in formation which may be easily stacked for shipping or storage. The bag machine 20 is powered by a motor 30 with all bag forming functional elements driven in synchronism through the use of a suitable gear train 32. The bag machine 20 delivers a continuous stream of bags to the collating and stacking apparatus 22, which is positioned at a discharge or downstream end 36 of the bag machine. Herein individual flattened bags 37, having closed ends 38 folded back over an open body portion 39 are fed directly into bag receiving slots 40 formed about the perimeter of a star wheel 41. Power for the collating and stacking apparatus 22 is provided by means of a power take-off arrangement 34, providing a synchronizing drive connection between the bag machine 20 and the collating and stacking apparatus 22. A drive train 42 powered by the power take-off arrangement 34 provides a mechanical power distribution arrangement to synchronously drive each of the various functional elements of the apparatus 22 including the conveyor 24.

The star wheel 41 includes a pair of spaced disc members 47 mounted on a rotatable shaft 49 which is in turn journalled at opposite ends thereof in bearings 50 which are supported on mounting brackets 51 depending from the bag machine 20. Each completed, flattened bag 37 emerging from the bag machine is intercepted in turn by one of the slots 40 in a timed relationship to the production rate. The bags are carried in the slots 40 downward around the star wheel 41 for arranging in a stack with side edges thereof being in vertical alignment, on a pan 53 of the conveyor 24. A pair of curved stop plates 54, which are adjustably secured to the pan 53 are positioned to intercept and decelerate the bags 37 as they pass around to the lowest area of the star wheel 41. The plates 54 further serve to strip the bags from the slots 40 while providing a stack aligning stop face 55.

After a predetermined quantity of bags have been collected in a stack on the conveyor pan 53 they are advanced onto a transfer surface 57 of the apparatus 22 wherein the stacks are oriented in a desired array for feeding into the bundle forming and wrapping apparatus 29 as generally described in the aforementioned patent application Ser. No. 053,027. The stacks are advanced along the conveyor 24 by means of a pair of counting flights 58 drivably connected to a pair of spaced endless sprocket chains 59. Each of the chains 59 is mounted for orbital travel below the pan 53 about a pair of sprockets 60 and 61 with each of the counting flights 58 pivotably connected to a related chain 59 for side-by-side travel about the sprockets.

Sprockets 60 are carried on a shaft 62 which is supported from side plates 63 on bearings 65. The sprockets 61 are mounted for rotation with a drive shaft 66 which is also supported from the side plates 63 on bearings 67. A sprocket 68 also mounted on the drive shaft 66 is driven by a roller chain 69 from a sprocket 70 which derives its power from the drive train 42 as may be seen in FIG. 1 and accordingly, is driven synchronously with respect to the star wheel 41 and the functional elements of the collating and stacking apparatus 22.

Figure 5:
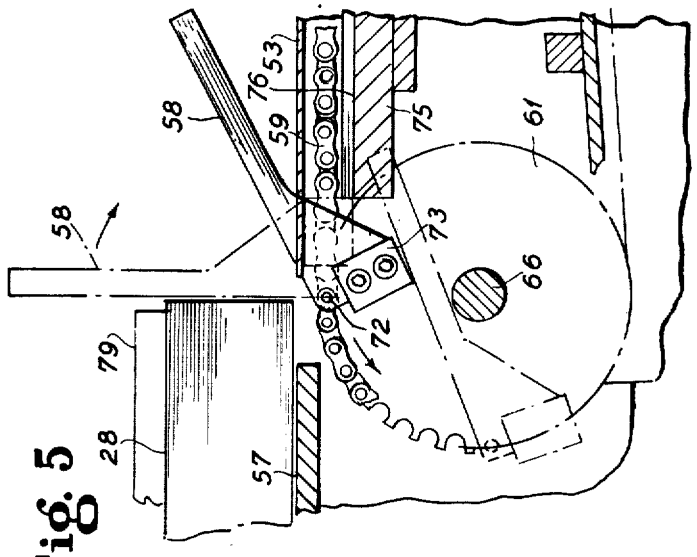
FIG. 5 is an enlarged fragmentary sectional view of the discharge end of the infeed counting conveyor shown in FIG. 4.

Each counting flight 58 is carried on one of the sprocket chains 59 on a pivot pin 72 extending laterally from the chains. The pins 72 pivotably support a forward portion of the flights while a trailing portion is provided with a slide block 73 which is adapted to support the flights in an upstanding conveying position. Herein, a pair of rails 75, extending parallel along the length of the conveyor 24 provide a guide track surface 76 upon which the slide blocks 73 travel to forestall any pivotal motion of the flights about the pins 72. Thus, the flights 58 are maintained in a conveying posture in which a top portion thereof extends upward through elongated slots 78 in the pan 53. The flights are advanced the length of the slots 78 in a conveying position up to the point where the rails 75 terminate (as best seen in FIG. 5), at which point a stack of bags 28 will have been moved by the flights 58 onto the transfer surface 57 for subsequent stack arranging and positioning in connection with a bundle forming and wrapping operation. The positioning of the bags on the transfer surface is of significant importance since the stacks must be accurately spotted relative to a swing transfer member 79 of the apparatus 22 to provide a smooth operating system.

As the chain 59 advances the counting flights 58 to the point where the slide blocks 73 are no longer supported on the guide surfaces 76 of the rails 75 as shown in FIG. 5, gravity will cause the flights to pivot about the pins 72 and fall backward away from the stack 28. With continued travel, the flights will drop down below the supporting surface of the pan 53 while following the chain around the sprocket 61. When the flights 58 are carried back toward the sprocket 60 along the return run of the chains 59 they assume a pendent condition as seen in dotted lines in FIG. 4 at which time the slide blocks 73 are guided along surfaces 81 to stabilize the flights 58 in returning to the stack collecting end of the conveyor 24. Each guide surface 81 includes a curved portion 82 which accommodates moving the flights about the sprockets 60 and to bring the slide blocks 73 into aligning orientation with the guide track surfaces 76.

Figure 4:
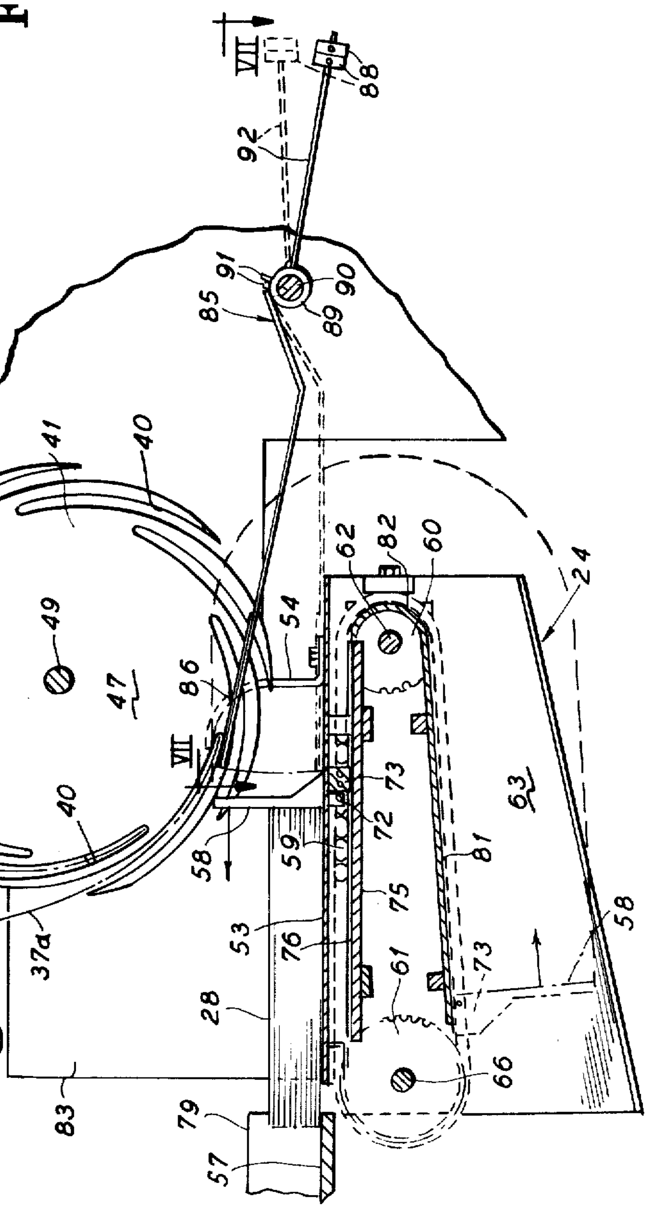
FIG. 4 is a vertical sectional view taken generally along the line IV—IV of FIG. 2.
Figure 2:
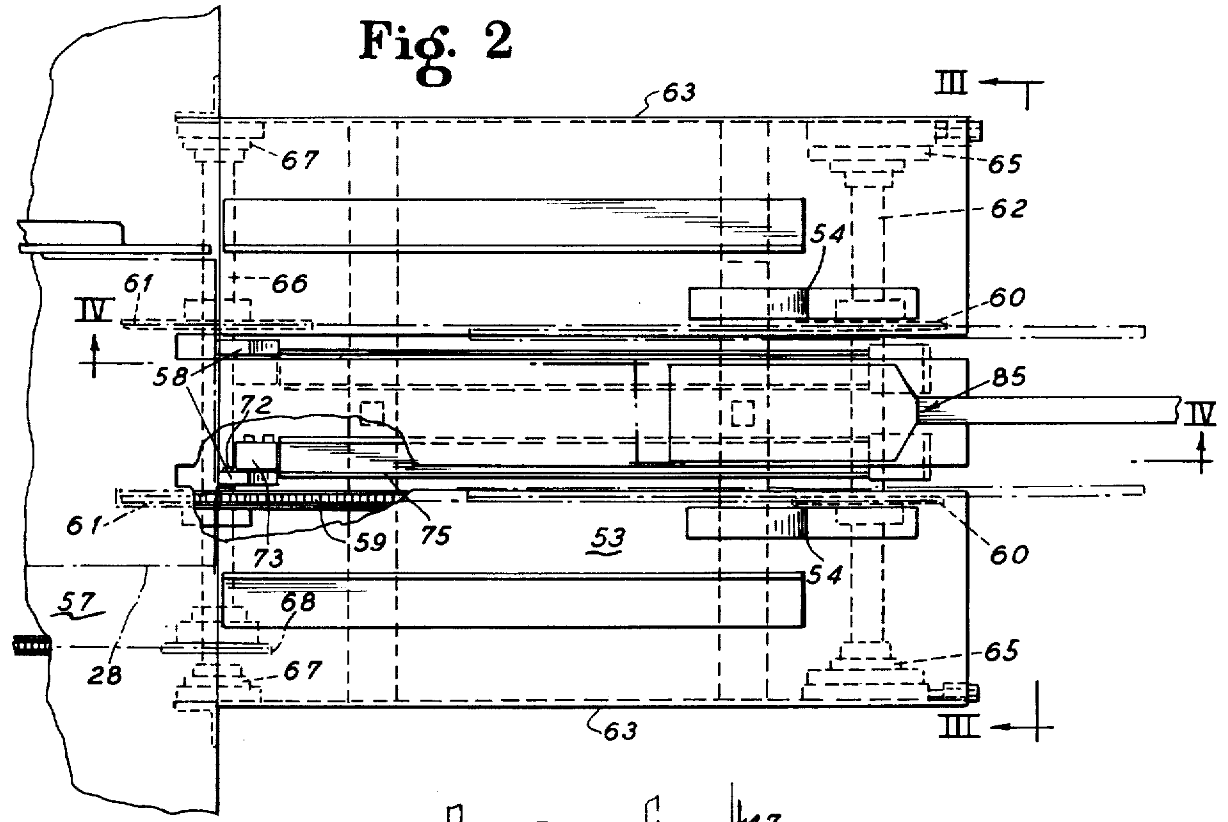
FIG. 2 is an enlarged plan view of the infeed counting conveyor apparatus.
Figure 3:
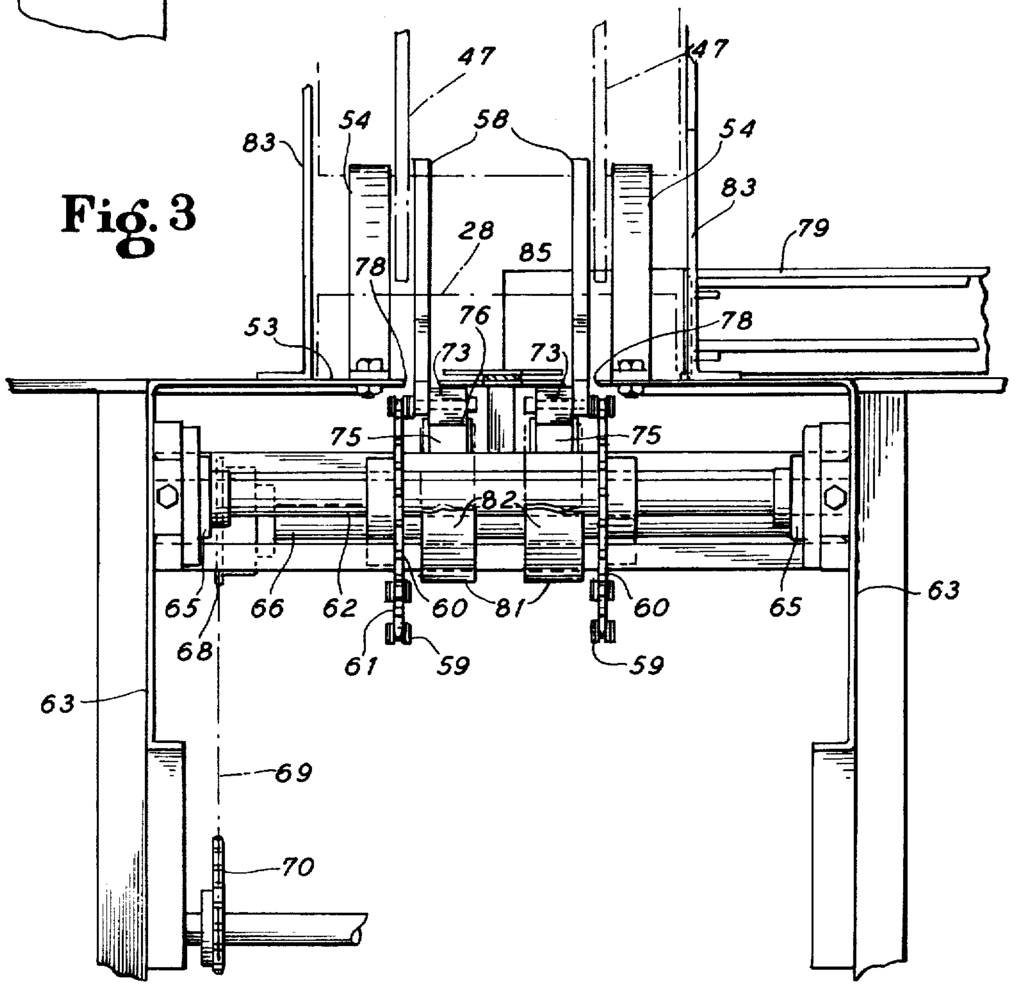
FIG. 3 is an end elevational view taken along the line III—III of FIG. 2.

The relative synchronization as provided between the star wheel 41 and infeed counting conveyor 24 is effective to form the bags produced by the bag machine 20 into stacks of a uniform count. Herein, the counting flights 58 complete one orbital path around the sprockets 60 and 61 during the time a predetermined quantity of bags are deposited on the accumulating surface of the pan 53. For example, after the required quantity of bags are collected in a stack 28 on the conveyor pan 53, the flights 58 move the stack out from under the star wheel 41, as generally shown in FIG. 4, and advance the stack downstream toward the transfer surface 57. Side guides 83, mounted to the conveyor pan 53 in spaced relationship relative to one another, retain the sides of the stacks in vertical alignment.

Figure 6:
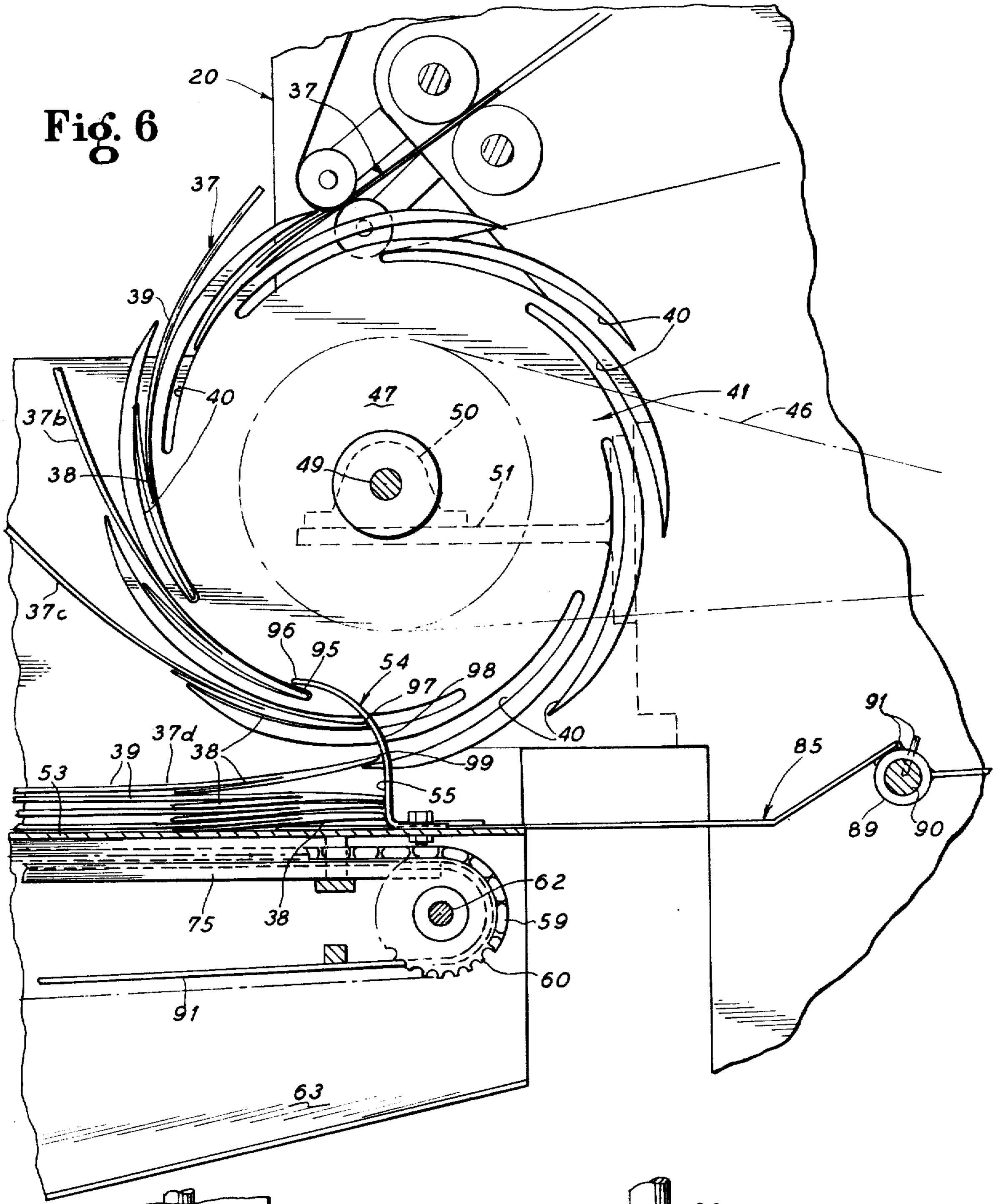
FIG. 6 is an enlarged fragmentary sectional view of the receiving end of the infeed counting conveyor shown in FIG. 4.
Figure 7:
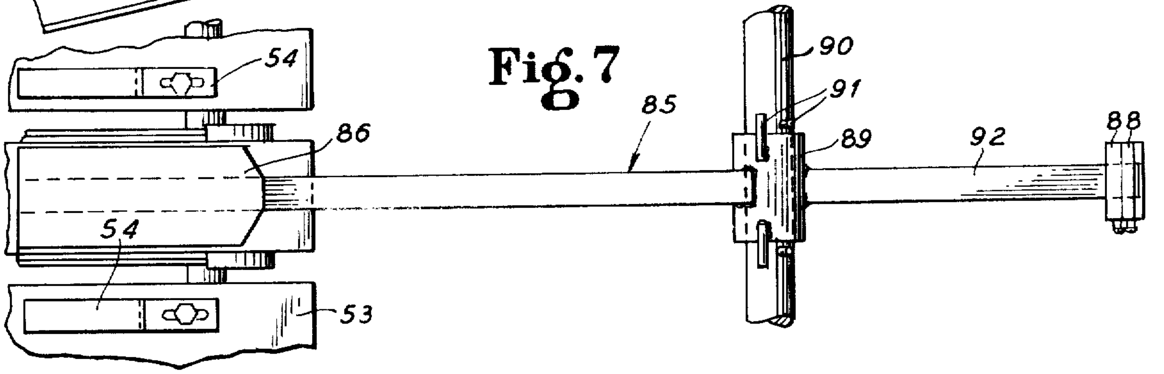
FIG. 7 is an enlarged fragmentary sectional view taken generally along the line VII—VII of FIG. 4.

Now as the pre-counted stack 28 is moved clear of a paddle separating device 85 as seen in FIG. 4, a paddle member 86 of the device 85, stationed between the disc member 47, tips upward in response to the action of balance weights 88, making contact with a bag 37*a* to retain it momentarily in an elevated position to thereby prevent the bag from being dragged downstream with the counting flights 58. The bag 37*a* is intercepted by the stop plates 54 and stripped free of the bag receiving slots 40 while supported in an elevated position sufficiently long so as not to be displaced by the flights 58. After several bags have been stripped from the slots 40 and with a time interval allowing for the flights to have moved the stack well downstream the weight of the several bags will cause the paddle member 86 again to swing down to rest on the accumulating surface of the pan 53, as shown in FIG. 6. Hereafter, the bags are again supported generally flat on the conveyor in abutment with the stop face 55 of the plate 54. The paddle separating device 85 includes a hub 89 which is pivotably supported on a shaft 90. Stop pins 91 are provided to limit upward travel of the device 85 beyond a desired position. The balance weights 88 are adjustably carried on a leg 92 of the device 85 to control the supporting duration for the several bags when beginning the formation of a new stack.

Now with specific reference to FIG. 6 it will be seen that a leading edge 95 of a bag 37*b* is about to be intercepted by a top portion 96 of the curved stop plate 54 while a leading edge 97 of a bag 37*c* has made contact with a curved portion 98 of the plate 54 which in addition to stripping the bag from the slots 40 decelerates and lowers the bag in the process. A leading edge 99 of the bag 37*d* has been fully decelerated and is about to be dropped onto the forming stack. Thus it will be understood that from the point where initial contact is made with the curved portion 98 of the stop plate 54 by a leading edge of a bag, to the junction with the stop face 55 the rotational speeds of the bags in the star wheel 41 will be slowed gradually to a stop. This deceleration action of the bags insures good stack alignment without the usual impacting bounce back associated with a straight face stop plate arrangement.

While our invention has been shown and described in connection with counting bags and feeding formed stacks of bags into a collating and stacking apparatus, it should be understood that our invention may be equally well suited in counting, forming stacks and conveying other generally flat materials as well. Further, although various modifications may be suggested by those skilled in the art, it should be understood that we wish to embody within the scope of the patent warranted hereon all such modifications as reasonably and properly come within the scope of our contribution to the art.

We claim as our invention:

1. An automatic infeed conveyor for forming generally flat pieces of material into vertically aligned stacks of a predetermind quantity comprising:

a star wheel having a plurality of peripheral slots therein with each slot arranged to receive an individual piece of said material from a delivery source;

a star wheel drive means arranged too rotatably drive said star wheel at a constant, predetermined speed;

a flight conveyor positioned adjacent said star wheel including a conveying surface having an accumulating area upon which a stack of material is formed and having counting flight means to automatically move a formed stack of material out of said accumulating area after a predetermined quantity of said material has been formed into said stack;

a decelerating stop means positioned in said accumulating area to intercept, decelerate and strip said individual pieces of said material from said star wheel slots for depositing said material on said conveying surface to accommodate the formation of said aligned stacks in said accumulating area;

a synchronized drive means being arranged to drive said counting flight means along said conveying surface at a speed proportional to said predetermined speed of said star wheel whereby a predetermined quantity of material is collected in an aligned stack on said conveying surface prior to being moved out of said accumulating area, and a separating means being effective to delay the formation of a new stack of material on said conveying surface for a predetermined time, said separating means including a paddle means operatively associated with said decelerating stop means to intercept and elevatably support material received from said star wheel for said predetermined time, being of a duration sufficient for said formed stack of material to be moved clear of said accumulating area, said paddle means is adapted to rest flat on said conveyor surface when a preselected quantity of said flat pieces of material have been stripped from said star wheel and deposited on top of said paddle means during the formation of an aligned stack and adapted to assume a raised position remote from said conveying surface when less than said preselected quantity of said flat pieces of material have been stripped from said star wheel and deposited on top of said paddle means, said separating means further includes a counterbalance weight means being effective to control the movement of said paddle means relative to said conveying surface in response to the quantity of flat pieces of material deposited on top of said paddle means.

2. The automatic infeed conveyor in accordance with claim 1, wherein said separating means is pivotally mounted adjacent said accumulating area and said counterbalance weight means is carried on said separating means remote from said paddle means and being adjustably movable relative to said paddle means whereby said paddle means will elevationally support a quantity of said flat pieces which is less than said preselected quantity whereby said counting flight means, when moving a formed stack of material out of said accumulating area, will not displace said flat pieces of material which are elevationally supported.

3. The automatic infeed conveyor in accordance with claim 1, wherein said synchronized drive means includes a pair of spaced roller chains each drivably connected to a counting flight member of said counting flight means arranged for side-by-side orbital movement along a path having an upper conveying run and a lower return run wherein said formed stack of said predetermined quantity is collected in said accumulating area during the time required for said counting flight member to complete one orbital revolution along said upper conveying run and said lower return run.

4. The automatic infeed conveyor in accordance with claim 3 wherein said counting flight members are pivotally carried on said roller chains and are supported in an upstanding conveying position by a guide track and a follower means, said guide track means extending the length of said conveying surface and terminating adjacent a discharge area and said follower means carried by said counting flight members being arranged for movement along said guide track means for supporting said counting flight members in an upright conveying position for advancing a stack along said conveying surface whereby when said follower means moves beyond a terminal end of said guide track means said counting flight members are caused to retract from said conveying position to spot said stack in a required discharge position.

5. The automatic infeed conveyor in accordance with claim 1, wherein said decelerating stop means comprises a pair of spaced apart stop plates each having an upper curved portion and a lower vertical stop face portion, said stop plates being positioned relative to said star wheel whereby said curved portion cooperates with said slots of said star wheel to successively intercept and decelerate each of said individual pieces of material rotatably carried in said slots while lowering and stripping said material from said slots for abutment against said lower vertical stop face portion to form a vertically aligned stack on said conveying surface in said accumulating area.

* * * * *